United States Patent

[11] 3,601,358

| [72] | Inventor | Lee H. Cruse |
| | | Springfield, Mo. |
| [21] | Appl. No. | 854,655 |
| [22] | Filed | Sept. 2, 1969 |
| [45] | Patented | Aug. 24, 1971 |
| [73] | Assignee | Foster Manufacturing Co. Inc. |
| | | Springfield, Mo. |

[54] CHARGING VALVE CONNECTOR
3 Claims, 3 Drawing Figs.

[52] U.S. Cl. ..................................................... 251/144,
251/118, 251/351, 251/149.8
[51] Int. Cl. ..................................................... F16k 5/02,
F16k 31/44
[50] Field of Search .......................................... 251/144,
142, 149.8, 351, 346, 118

[56] References Cited
UNITED STATES PATENTS
87,922  3/1869  Franz ............................ 251/351 X

| 1,555,013 | 9/1925 | Kraft | 251/351 X |
| 2,823,699 | 2/1958 | Willis | 251/351 X |
| 3,378,225 | 4/1968 | Snyder, Jr. | 251/149.6 |

*Primary Examiner*—William R. Cline
*Attorney*—John D. Pope, III

ABSTRACT: A charging valve connector is comprised of a cylindrical receptacle body mounted in the wall of a tank and providing communication between the interior and exterior of the tank. A movable valve element is threaded within the receptacle body and is rotatable for causing its movement from an open position, wherein it is spaced from a valve opening in the receptacle body, to a closed position wherein it closes the valve opening to prevent flow of fluid between the interior and exterior of the tank. A bore extends through the valve element and provides communication from the exterior of the tank to the valve opening when the valve element is in its open position, thereby providing a line of communication from the exterior of the tank to its interior through the valve opening.

PATENTED AUG 24 1971    3,601,358

INVENTOR
LEE H. CRUSE

BY John D. Pope III

ATTORNEY

CHARGING VALVE CONNECTOR

This invention relates to valves and more specifically to a charging valve connector.

There are presently many applications for valves which permit the injection of a fluid under pressure into a tank or container. For example air conditioners, refrigerators, and other cooling devices include tanks which must be charged with pressurized refrigerant media. These tanks require valves which permit the injection of the media without leaking and which are simple and economical to manufacture.

Among the several objects of the present invention may be noted the provision of a charging valve connector which permits the injection of fluid into a tank under pressure without leaking; the provision of a charging valve connector which can be mounted permanently on the tank or container; the provision of a charging valve connector which can be easily coupled to a source of pressurized fluid with a minimum of effort; the provision of a charging valve connector which has a minimum number of moving parts; the provision of a charging valve connector which can be easily tightened and loosened with a wrench; and the provision of a charging valve connector which is economical to manufacture and durable to use. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a perspective view of the charging valve connector;

Corresponding reference characters indicated corresponding parts throughout the several views of the drawings.

Figure 1:
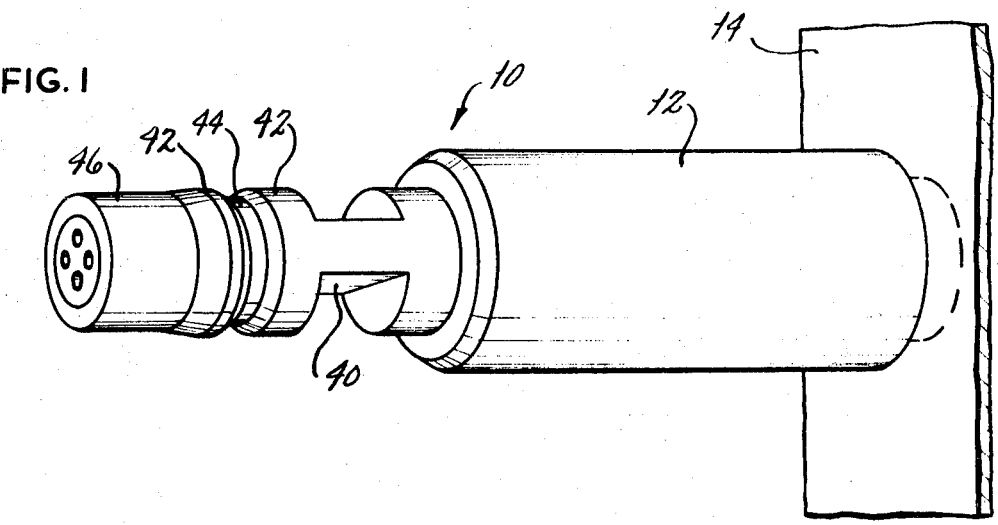
Figure 2:
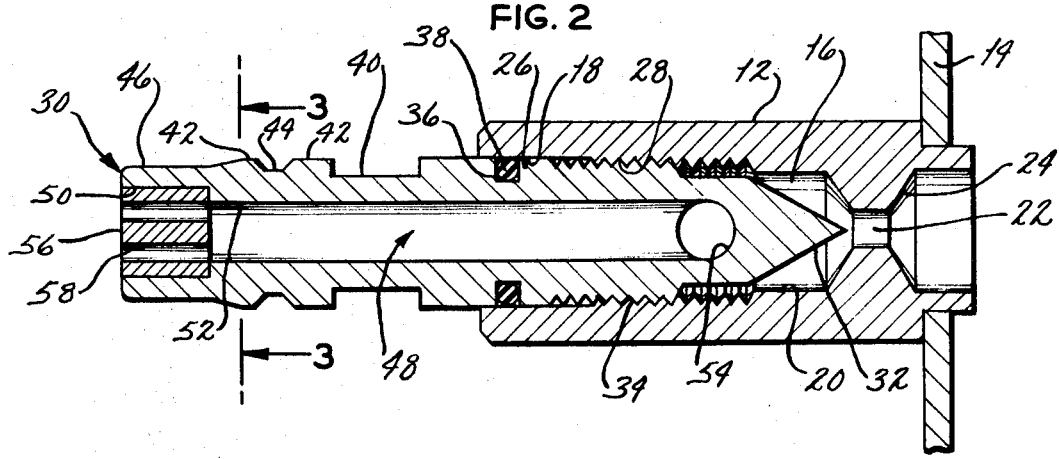
FIG. 2 is a sectional view of the charging valve connector.
Figure 3:
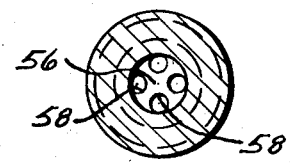
FIG. 3 is a sectional view taken along line 3—3 of FIG. 2.

A charging valve connector 10 has a receptacle body 12 rigidly mounted in the wall of a tank 14. Receptacle body 12 is substantially cylindrical in shape and includes a receptacle chamber 16 formed in its interior. Receptacle chamber 16 includes a cylindrical major cavity 18 and a cylindrical minor cavity 20. Minor cavity 20 is of a smaller diameter than major cavity 18. A valve opening 22 is formed by an annular inwardly protruding shoulder 24 located adjacent the inner end of minor cavity 20. Valve opening 22 provides communication between receptacle chamber 16 and the interior of tank 14. Major cavity 18 includes a smooth inner wall 26 adjacent its outermost end and a threaded portion 28 adjacent its innermost end.

A movable valve element or needle body 30 is threadably received in receptacle chamber 16 of body 12. Valve element 30 includes an inner end 32 which is tapered to a point and which is positioned within minor cavity 20 of receptacle chamber 16. A threaded portion 34 is provided on the exterior surface of valve element 30 adjacent inner end 32. Threaded portion 34 of valve element 30 engages threaded portion 28 of receptacle chamber 16. Located on valve element 30 immediately outwardly from threaded portion 34 is an annular groove 36 in which is seated an elastomeric O-ring 38. O-ring 38 engages the smooth inner wall 26 of major cavity 18, forming a fluidtight seal between valve element 30 and the walls of receptacle chamber 16. The outer end of valve element 30 extends outwardly beyond the end of receptacle body 12. It is provided with a plurality of wrench flats 40 adapted to receive a wrench and two annular coupling shoulders 42 having a coupling groove 44 positioned therebetween. The extreme outer tip of valve element 30 is formed into a cylindrical nose 46.

Extending longitudinally through valve element 30 is a longitudinal bore 48 having an enlarged diameter portion 50 within nose 46 and a diminished diameter portion 52 extending inwardly therefrom and terminating in two radially extending apertures 54 which are in communication with minor cavity 20 of receptacle chamber 16. Inner end 32 of valve element 30 has a slightly smaller diameter than that of minor cavity 20 so that fluid can flow out of radial apertures 54 into minor cavity 20.

A cylindrical insert 56 is press fitted within enlarged diameter portion 50 at the extreme outer end of valve element 30 and includes a circular array of axially extending ports 58. A line of communication is thus provided from the atmosphere outside tank 14 through ports 58, bore 48, radial apertures 54, minor cavity 20, and valve opening 22 into the interior of tank 14.

To fill tank 14 with a pressurized fluid, valve element 30 is threadably inserted in receptacle chamber 16 with O-ring 38 providing a fluidtight seal against smooth inner wall 26 of receptacle chamber 16. Inner end 32 of valve element 30 is positioned in an open position wherein it is spaced from valve opening 22. A quick-connect fluid-line coupling such as disclosed in my Pat. application Ser. No. 590,721, filed Oct. 31, 1966, is snapped over the outer end of valve element 30 and is retentively held thereon by coupling shoulders 42 and coupling groove 44. The fluid-line coupling (not shown) is adapted to introduce pressurized fluid into ports 58 of insert 56, thereby causing fluid to flow through bore 48, apertures 54, minor cavity 20 and valve opening 22 into tank 14. When the tank is full, a wrench is applied to wrench flats 40 and valve element 30 is rotated so as to cause its axial movement to a closed position wherein the pointed portion of inner end 32 protrudes within and closes off valve opening 22. In its closed position, valve element 30 prevents any flow of fluid between the interior of tank 14 and minor cavity 20 of receptacle chamber 16. The quick-connect coupling may be disconnected from the outer end of valve element 30 after completing the charging of tank 14 with pressurized fluid.

The charging valve connector of this invention utilizes only three moving parts: valve element 30, receptacle 12 which threadably receives valve element 30, and O-ring 38 which provides a seal between valve element 30 and receptacle 12. Because of its simple construction, valve connector 10 can be permanently mounted on the tank of an air conditioner, refrigerator, or other device utilizing pressurized fluid. The provision of wrench flats 40 makes possible the tightening of valve element 30 to insure a tight fit so that there will be no leakage when it is closed. The seal provided by O-ring 38 insures that no fluid escapes from receptacle chamber 16 either during the filling operation or after valve element 30 has been closed.

In view of the above, it will be seen that the several objects of the invention are achieved and other advantageous results attained.

What I claim is:

1. A charging valve connector comprising a receptacle body adapted to be mounted on the wall of a tank and including a receptacle chamber and a valve opening providing communication between said receptacle chamber and the interior of said tank; a movable valve element threaded within said receptacle body and having an inner end extending within said chamber and an outer end adapted for coupling to a source of fluid; and a bore extending through said valve element and providing communication from said outer end into said receptacle chamber whereby fluid is free to flow through said bore into said receptacle chamber when said outer end is coupled to a source of fluid; said valve element being rotatable to cause its axial movement from an open position wherein said inner end is spaced from said valve opening to a closed position wherein said inner end closes off said opening to prevent the flow of fluid between said receptacle chamber and said tank, said bore including an enlarged diameter adjacent said outer end, an insert being retained within said enlarged diameter portion, said insert having a port extending therethrough.

2. The charging valve connector of claim 1 wherein said insert includes a plurality of ports extending therethrough.

3. The charging valve connector of claim 2 wherein said bore includes a reduced diameter portion located adjacent said enlarged diameter portion, said ports being positioned in a circular array and being in communication with said reduced diameter portion of said bore.